Nov. 18, 1952     R. R. CAMERON     2,618,726
METHOD AND MEANS FOR SECURING METAL MEMBERS TOGETHER
Filed Aug. 13, 1951
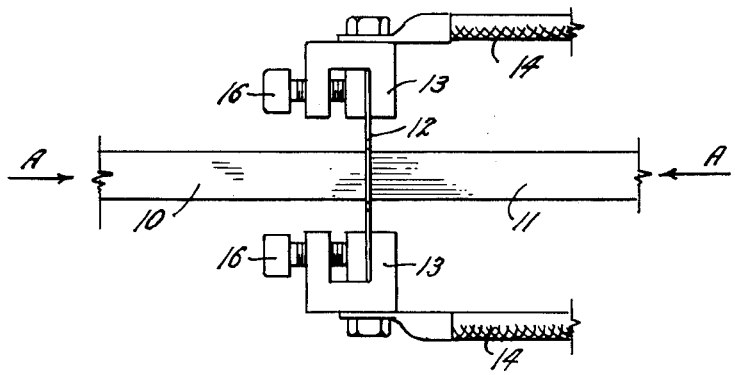
Fig. 1
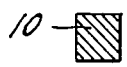
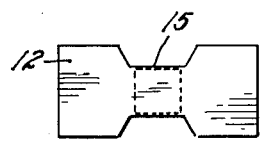
Fig. 2
Fig. 3
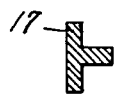
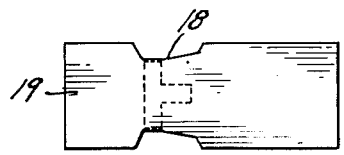
Fig. 4
Fig. 5
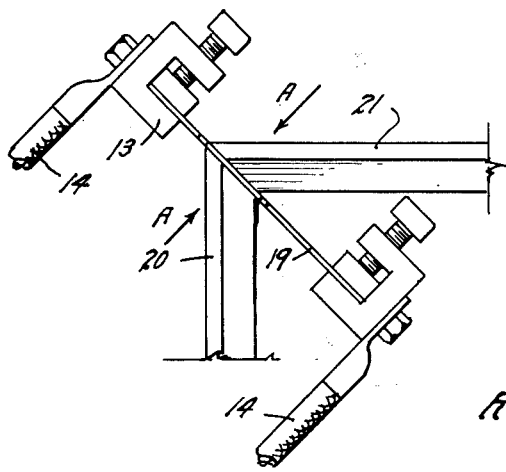
Fig. 6
INVENTOR.
Robert R. Cameron
BY
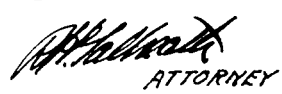
ATTORNEY Patented Nov. 18, 1952

2,618,726

UNITED STATES PATENT OFFICE 2,618,726

METHOD AND MEANS FOR SECURING METAL MEMBERS TOGETHER

Robert R. Cameron, Denver, Colo.

Application August 13, 1951, Serial No. 241,563

3 Claims. (Cl. 219—4)

This invention relates to an electrical method and means for permanently securing metallic members together through the medium of a fused metal joint. At present, metal joints are formed electrically by means of resistance welding and arc welding. In resistance welding, the members to be welded are heated by the heat created by the electric resistance at the contact point between the two members to be welded. In arc welding, an electric arc is drawn from the metal electrode to apply fused metal to the joint. The first method heats and distorts the members being welded and the second method forms an objectionable raised bead at the weld.

The principal object of the present invention is to provide a metal joining method which will neither heat nor distort the members being joined and which will eliminate entirely the necessity for forming a bead or enlargement at the joint.

In both the present resistance and arc welding method, the electrical current is passed through the members being welded, thus overheating the latter and often resulting in accidental electrical contacts with the work to the damage of the latter.

Another object of this invention is to provide a method and means for forming fused joints between metal members in which no electrical current is passed, through the members to be welded. In fact, as far as this method is concerned, it is not necessary that the members even be electrically conductive. The invention is particularly applicable for use with aluminum alloy frames such as used in modern windows, doors, etc. It is exceedingly difficult to satisfactorily attach such frames together by means of either resistance or arc welding, due to the distortion placed in the frames by the heat at the joints and the fact that a raised bead is formed at the joint which is caused by the two members being forced together when in a fluid state. In members of a complicated cross section, it is exceedingly difficult to grind off or otherwise remove this objectionable raised bead at the joint.

A further object of the invention is to provide a method for attaching two members together, wherein a thin fusible link or insert of metal is melted between the members to form the attaching medium without heating or distorting the members in any way.

A still further object is to provide an electrical metal joining method which will automatically act to shut off the welding current when the weld is complete.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a diagrammatic side view illustrating the invention being used to join two rectangular metal bars together in abutting relation;

Fig. 2 is a cross section through one of the rectangular bars of Fig. 1;

Fig. 3 is a detail view illustrating a fusible link employed for joining the bars, of Fig. 1;

Fig. 4 is a cross section through the conventional T bar;

Fig. 5 illustrates a fusible link of a type to be employed for joining two of the T bars of Fig. 4, together in abutting relation;

Fig. 6 is a diagrammatic side view illustrating the invention being used to join two T-shaped frame members to form a rectangular corner.

In Fig. 1 of the drawing, the two metal bars to be joined together in abutting relation are illustrated at 10 and 11. With the use of the present invention, these two bars are welded or secured together by forming a thin layer of molten metal between the extremities of the two bars, the temperature of the molten metal being sufficient to melt a microscopic layer of metal on each bar extremity and attach itself thereto to form a continuous bar.

The above is accomplished by placing a very thin fusible metal link 12 between the members 10 and 11, and forcing the latter against opposite faces of the link. A terminal clamp 13 is applied to each extremity of the link 12. The clamps 13 are connected to a source of low voltage, high amperage electrical energy by means of suitable electrical conductors 14. The portion of the fusible link 12 which is clamped between the extremities of the bars 10 and 11 is narrowed to a less cross section than the extremities of the link 12.

Electrical current is impressed on the link to instantly fuse the narrow portion thereof, and since this narrow portion of fused metal is in contact with the terminal surfaces of the bars 10 and 11, it will instantly fuse itself to the surfaces without heating the bars. It is possible that the bars are fused for a microscopic depth adjacent the fused link to obtain a perfect weld at this point. The heating, however, does not extend for any material distance into the bars, and the latter remain cold.

It will be noted that no control devices are necessary in the electric circuit through the conductors 14, since the fusing of the link 12 acts automatically to break the circuit the instant the weld is completed similarly to the well known action of "blowing a fuse." The fusable links are engineered to the particular work being done. For instance, to weld the two rectangular bars 10 and 11 the link 12 will have a narrowed medial portion 15 having a width and length slightly in excess of the width and thickness of the bar 15, and relatively wider extremities.

In use, the bars 10 and 11 are placed against the opposite faces of the link 16, as indicated in broken line in Fig. 3, and since the greatest resistance to the flow of current is through a narrow portion 17, this portion will fuse under the influence of the current. The entire fusing operation required a fraction of a second. It is believed, however, that the link severs or separates and perhaps forms an instant traveling arc along the surfaces of the bars for an instant before the circuit is broken. Since the entire operation is accomplished in an interval of $\frac{1}{100}$ of a second, the exact action of the fusing is not known. The result is a continuous bar with no projection at the joining, other than occasionally a thin ribbon-like portion of the insert, which can be readily broken, cut or wiped away.

In Fig. 4, a bar having a T-shaped cross section is indicated at 17, and a fusible link designed for this particular cross section is indicated at 19 in Fig. 5, with the position of the bars thereon indicated in broken line. The link 19 is designed so that the portion of least cross section will be positioned opposite the center of gravity of the bar section, as indicated in Fig. 5.

In Fig. 6, two of the T-shaped frame members are indicated at 20 and 21, forming a rectangular corner, the sections being cut on a bevel of 45°. The link 19 is positioned between the two adjacent cut extremities of the members 20 and 21. The extremities of the link are engaged in the clamps 13 and the current is applied to fuse the link to the extremities of both the members 20 and 21, and simultaneously break the electrical circuit. Any portions of the link projecting above the surfaces of the members 20 and 21 can be readily broken or cut away, leaving a smooth continuous corner.

It is desired to call attention to the fact that the members being fused together are not in the electrical circuit, and that no portions of the fusible links lie on the surfaces of the members. Therefor there is no distortion or upsetting of the member extremities, and no external metal to be removed. The links are preferably formed with the same metal or alloy as the members to be welded, so as to provide an invisible joint having the same strength as the remainder of the members. They can, however, be formed from different metals or alloys, depending upon the results desired. Ordinary resistance welding devices require elaborate timing devices to stop the current flow at the proper completion point of the weld. With this improved method, however, no such control devices are necessary since the current flow will be stopped automatically and instantly by the fusing of the link upon the completion of the weld.

It is, of course, to be understood that any conventional means may be employed for forcing the members to be joined into snug, abutting relation, the force to be applied in the direction of the arrows "A" in Fig. 1 and Fig. 3.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A method of joining two metal bars in end-abutting relation comprising: placing a relatively thin, metallic link between the abutted extremities of the bars; connecting the extremities of the link to an electrical source; and applying current to the extremities of the link to fuse the link between the bars, the intermediate portion of the metallic link being reduced in cross section to create an area of maximum electrical resistance between the abutting bars.

2. A method of joining metal bars as described in claim 1; in which the extremities of the flat metal link have sufficient width to prevent fusing of the insert, except at its intermediate portion.

3. Means for joining metal members in abutting relation comprising: a relatively thin flat fusible metallic link having a mid portion of reduced cross-section; clamping means clamping each extremity of said link; electrical conductors connected to each clamping means to place said link in a closed electrical circuit, said link being adapted to be positioned between the abutted extremities of the metal bars with the latter contacting the opposite faces of the intermediate portion of the link.

ROBERT R. CAMERON.

REFERENCES CITED

The following references are of record in the file of this patent:

UNITED STATES PATENTS

| Number | Name | Date |
|---|---|---|
| 1,038,604 | Lachman | Sept. 7, 1912 |
| 1,213,422 | Sacek | Jan. 23, 1917 |

FOREIGN PATENTS

| Number | Country | Date |
|---|---|---|
| 236,887 | Great Britain | Dec. 31, 1926 |